Patented May 29, 1951

2,554,567

UNITED STATES PATENT OFFICE 2,554,567

PEROXIDE-POLYESTER CATALYST COMPOSITION

Howard L. Gerhart and William H. Lycan, Milwaukee, Wis., assignors to Pittsburgh Plate Glass Company, a corporation of Pennsylvania No Drawing. Application October 27, 1945, Serial No. 625,104

6 Claims. (Cl. 260—75)

The present invention relates to catalyst compositions suitable for promoting reactions involved in resinifications and it has particular relation to preparation of catalyst compositions suitable for promoting the copolymerization of styrene or similar polymerizable aralkene compounds and unsaturated alpha-beta dicarboxylic acids capable of copolymerization with such compounds by reactions of addition at the double bonds of the two compounds.

One object of the invention is to provide a process of incorporating catalysts of polymerization into polymerizable compounds and mixtures whereby the danger of premature gellation of the polymerizable substance is substantially obviated.

A second object of the invention is to provide a process of incorporating catalysts of copolymerization into mixtures of (A) styrene or similar polymerizable olefinic compounds and (B) esters of unsaturated dicarboxylic acids in which the time and effort involved in the incorporation of the catalysts is reduced to a minimum.

A third object is to provide a process of incorporating insoluble catalysts into polymerizable mixtures of styrene or its equivalent and unsaturated alpha-beta dicarboxylic acids or esters thereof in which the use of non-reactive solvents in the polymerizable mixture is obviated.

These and other objects of the invention will be apparent from consideration of the following specification and the claims.

In the preparation of certain resins and especially resins of the addendum type such as are obtained by conjointly polymerizing styrene or its chloro or methyl derivatives and esters of unsaturated alpha-beta dicarboxylic acids such as maleic acid, fumaric acid or carbic acid, it is desirable to add a catalyst of polymerization to the polymerizable mixture before the application of heat for purposes of effecting the copolymerization. Most commonly, a peroxide such as benzoyl peroxide, tertiary butyl hydroperoxide, cyclohexyl peroxide, acetyl peroxide, lauroyl peroxide or the like is employed for the purpose. Most of these peroxides are insoluble or soluble with difficulty in the polymerizable monomers so that in order to obtain satisfactory dispersion in a typical polymerizable mixture, it is necessary to subject the mixture of catalysts and polymerizable monomer to violent agitation for a period of 30 to 60 minutes. During this period, premature gellation is likely to occur. If dispersion is incomplete, small particles of the undissolved peroxide floating in the liquid mixture will cause local over-heating and non-homogeneous polymerization. Likewise, violent agitation may introduce air which is generally detrimental.

In order to obtain adequate dispersion of the catalyst within a reasonable time, it has heretofore been proposed preliminarily to disperse the peroxide catalyst in an inert liquid medium to form a paste. For example, it has been proposed to prepare dispersions of the catalysts of a cream like consistency in a liquid such as tricresyl phosphate, dimethyl phthalate, castor oil or the like. These dispersions could be incorporated with the polymerizable mixtures more readily than could the undispersed or undissolved catalyst. However, the catalyst mixtures still were unsatisfactory for commercial use because in order to form a satisfactory paste, it was usually necessary to include about 50% upon the basis of catalyst mixture of the dispersing medium. About 1 to 5% of catalyst was required in the polymerizable mixtures so that 2 to 10% of the dispersing medium was introduced into the polymerizable mixture. The dispersing medium has a detrimental effect upon the resins obtained from the polymerizable mixtures. For example, the hardness as determined by the Rockwell, Barcol, or similar tests, was reduced and the flexural strength, compressive strength and the impact of resistance were adversely affected. Furthermore, it was found that the dispersing medium remaining in the resin tended to diffuse out of the resins as the latter aged, thus causing shrinkage of the plastic bodies with resultant checking, warping and cracking of the bodies as well as objectionable dimensional changes. In many articles which might be formed of the resins, e. g. dentures, steering wheels, electrical housings, lenses and apparatus employed in medicine, dentistry and similar purposes, the diluents were highly undesirable and often inadmissible because of such shrinkage. In some cases they were objectionable by reason of toxicity or for other reasons.

The present invention involves the provision of an improved catalytic composition which can be readily incorporated with polymerizable mixtures of the previously described type without introduction of diluents and with a minimum expenditure of time and effort. According to the invention, these results are obtained by the dispersal of the catalytic substance in a constituent which can enter into the copolymerization with other polymerizable ingredients of the resinifiable mixture so that upon polymerization of the mixture, the catalyst carrier is permanently incorporated as a component of the resin body.

The reaction is applicable to a wide range of polymerizations where a plurality of components may be interacted to form a homogeneous copolymer. The pastes can also be added to any polymerizable mixture or compound such as styrene, methyl methacrylate or the like in which a peroxide catalyst is useful. It is particularly applicable to polymerizations in which one component of the copolymer by itself polymerizes only slowly or not at all, even in the presence of the catalyst and in which the polymerization of the mixture of the several components when they have been brought together proceeds rapidly even at moderate temperatures. The copolymerization of the aralkene compounds or substitutes thereof and unsaturated alpha-beta dicarboxylic acids or esters of such acids which copolymerize by addition therewith is illustrative of the principles of the invention. In these polymerizations the catalyst may be preliminarily mixed with all or a portion of the ester component without gellation and the resultant composition can be easily and quickly mixed with the second component of the resin as well as any residual ester component immediately prior to the copolymerization reaction.

ARALKENE COMPONENT OF RESIN

Aralkenes which constitute one component of the resin may include styrene, p-methyl styrene, alpha methyl styrene, indene or the chloro derivatives thereof.

ACID OR ESTER COMPONENT OF RESIN

The esters which may function as the carrier of the catalyst may be prepared from such acids as maleic acid, methyl substituted maleic acid, monochloro maleic acid, fumaric acid, chloro fumaric acid, "Carbic acid" or any other unsaturated alpha-beta dicarboxylic acid, the double bond of which is capable of reacting by addition with the ethylenic groups in aralkene to form copolymers. The term "Carbic acid" designates 3,6 endomethylene, Δ4 tetrahydrophthalic acid derived by Diels-Alder reaction of cyclopentadiene and maleic acid. The following constitute specific examples of polyesters as contemplated by the invention for use as carriers of the catalyst and also as components for copolymerization with the aralkene.

Group A

Diethylene glycol polyester of:

Maleic acid
Chloromaleic acid
Methyl substituted maleic acid
Fumaric acid
Carbic acid

Group B

Triethylene glycol polyester of:

Maleic acid
Chloromaleic acid
Methyl substituted maleic acid
Fumaric acid
Carbic acid

Group C

Dipropylene glycol (1,2 or 1,3) polyester of:

Maleic acid
Chloromaleic acid
Methyl substituted maleic acid
Fumaric acid
Carbic acid In esters of groups A to C the dihydroxy alcohols and the $\alpha,\beta$-dicarboxylic acids are preferably in equi- or approximately equimolecular ratio. The esterification reactions are conventional involving heating a mixture of the alcohol and the dicarboxylic acid (or the anhydride of the acid) to temperatures of about 150 to 200° C. until the acid value has been reduced to a point within the range of about 100 to 110 and a liquid viscous product is obtained.

It will be appreciated that mixed polyesters of polymerizable unsaturated alpha-beta dicarboxylic acids and saturated alpha-beta dicarboxylic acids may be employed in lieu or in admixture with any one of the esters, A to C, inclusive.

The unsaturated acids of such esters include any of the unsaturated acids listed in the foregoing examples. Saturated acids for mixed esters include phthalic acid, chlorophthalic acid (e. g., tetrachlorophthalic acid, tetrabromophthalic acid, succinic acid).

The following constitute examples of mixed esters contemplated.

Group D

A typical fluid polyester is prepared by interacting .1 mol maleic anhydride, .9 mol adipic acid and 1 mol diethylene glycol until the acid number is 50. Pure benzoyl peroxide is easily dispersed in this polyester to the extent of 60% of the peroxide to 40% of the polyester.

Group E

Diethylene glycol mixed polyesters of:

Maleic or Fumaric acid or Carbic acid } and { Phthalic acid or Tetrachlorophthalic acid or Adipic or Azelaic acid

Group F

Triethylene glycol mixed polyesters of:

Maleic or Fumaric acid or Carbic acid } and { Phthalic acid or Tetrachlorophthalic acid or Adipic or Azelaic acid In the preparation of these mixed polyesters a dihydroxy alcohol such as 1,2 or 1,3 propylene glycol, diethylene glycol, or triethylene glycol is admixed, for example, in a ratio of 2.2 mols with an unsaturated alpha-beta dicarboxylic acid or anhydride, e. g. maleic acid, fumaric acid or carbic acid in a ratio of .1 to 1.4 mols, e. g. 1 mol and 1.9 to .6 mol, e. g. 1 mol of saturated dicarboxylic acid or anhydride, e. g. phthalic acid, tetrachlorophthalic acid or succinic acid. To the complete mixture is added 4 to 20 per cent of an inert diluent, such as xylol or naphtha and the naphtha is refluxed while the water of reaction is eliminated by vaporization. The following constitutes a time schedule for the preparation of the polyesters:

| Time | Temperature |
| --- | --- |
| 0 to 2 hours | Room temperature to 150° C. |
| 2 to 20 hours | 150° to 190° C. |

The acid number of the mixture preferably is reduced to about 50, but the ester remains liquid. Subsequently a stream of an inert gas is passed through the liquid to remove the diluent.

THE CATALYSTS

It is to be understood that all or a portion of any of the preceding polyesters in a given charge or copolymerization may be admixed with a suitable catalyst of addendum polymerizations, Catalysts suitable for the purpose include acetyl peroxide, lauroyl peroxide, sodium peroxide, barium peroxide, tertiary butyl hydroperoxide, cyclohexyl peroxide, benzoyl peroxide and the like.

PREPARING THE PASTES OF THE CATALYSTS

These catalytic peroxides may be preliminarily pulverized by grinding or by precipitation methods as well understood in the art to provide finely divided materials that can be readily ground into or otherwise uniformly distributed in the polyesters which is to act as a catalyst carrier. The pastes if properly prepared will keep for many months without themselves setting up at any temperature to which they are likely to be exposed in storage. When mixed with polymerizable compounds or compositions, they become fully effective. Usually the catalyst and the carrier ester will be employed in such ratio that the catalyst will form a paste approximating that of toothpaste. These will be a paste like mixture which to some extent will hold its own form or shape independently of a container. The preferred ratio will be approximately 30 to 70 per cent of catalysts, the remainder of the mixture being the polyester carrier. A paste of this constituency can be introduced into collapsible tubes of the type employed as containers for toothpaste, artists' colors, and for similar purposes well known in the art from which they can be expelled as rods or ribbons of uniform section. When so packaged, the compositions are eminently suited for small applications, such as those involved in the manufacture of denture plates and the like from copolymerizable mixtures of the esters herein disclosed and aralkene such as styrene. In such operations, the requisite amount of catalyst can be extruded from the tube and measured off by ruler, thus avoiding tedius weighing or measuring operations and also assuring that the entire measured mass is introduced into the reaction mixture and not retained in part in a measuring container. A 40 to 60% ratio of catalysts is preferred. However, a much broader range may be preferable for certain applications, such as in commercial moldings. Accordingly, a range of 10 to 80 per cent of catalysts based upon the polyester is suggested.

RESIN FORMULATION

In the formulation of a copolymerizable mixture including an aralkene and a polyester suitable for use with the pastes herein disclosed, the following components may be admixed:

I. Aralkene
II. Polyester selected from groups A to F
III. Inhibitor
IV. Catalyst mixture Item I will comprise 15 to 50 parts by weight
Item II will comprise 30 to 95 parts by weight
Item IV will comprise (a) 0.1 to 5 parts by weight catalyst, (b) polyester selected from group A to F enough to make a composition of 10 to 80% catalyst concentration.

If the amount of catalyst is large and the concentration thereof in the mixture is low, it will be necessary to deduct the polyester so introduced from item II to prevent undue change of the ratio of the ingredients. If the ratio of catalyst is low and the concentration in the carrier fraction high, the amount of polyester so introduced can be disregarded. A portion, say 5 to 10 parts by weight of a free unsaturated dicarboxylic acid may be included in any of the resinifiable mixtures.

THE INHIBITOR

The aralkene component I (and the polyester component II) can be admixed and stored for considerable periods of time if desired before use. In order to prevent premature gellation during such periods of storage, component III (inhibitor) is then included in small amount. A suitable inhibitor mixture would comprise hydroquinone and a quaternary ammonium salt or a tertiary amine salt. A specific example of a suitable mixture would be .065 part of trimethyl benzyl, ammonium chloride, and .00065 part of quinone. These inhibitors are optional and are not required in event that the mixtures are to be polymerized at once.

The polyester in the carrier medium can easily be admixed with the aralkene and the remainder of the polyester of the resin formulation by simple agitation. Usually, five or ten minutes is quite sufficient for this purpose and there is little or no danger of premature gellation of the mixture during the operation. Since the catalyst in most instances is insoluble in the polyester carrier, it is readily observable when the mixing of the catalyst paste and the other components of the resin is complete.

APPLICATIONS OF THE RESINS

The polymerizable mixtures may be employed as coatings for wood, metal or the like and cured by baking. Preferably, however, they are employed as coating compositions by flowing them into molds. They may be used to impregnate glass fabrics, or other fibrous bodies, or they may be admixed with short glass fibers, asbestos fibers, wood fiber, wood flour talc and other fibers and fillers.

POLYMERIZATION OF THE MIXTURES

The copolymerization of the aralkene (styrene) or its equivalent and the polyester component to form a resin body follows conventional procedure. If no inhibitors are present, polymerization proceeds slowly even at atmosphere temperatures but may be accelerated by heating the mixture to a temperature, for example in a range of 75 to 200° C. If an inhibitor is present, it is desirable to heat the mixture. In any event, the temperature should not be so high as to cause discoloration or decomposition of the polymerizable mixture or the product resulting from the polymerization reaction.

The following constitute specific formulations for resins prepared in accordance with the provisions of the present invention:

Example I 34.5 parts diethylene maleate phthalate
18 parts styrene
5 parts maleic anhydride
0.065 part trimethyl benzyl ammonium chloride
0.00065 part quinone The mixture at ordinary temperatures is stable for months. When it is desired to polymerize the mixture, it is admixed with 1 part of paste containing equal parts by weight of catalyst, e. g. benzoyl peroxide and one of the polyesters herein disclosed, e. g. diethylene maleate phthalate. The mixture is agitated for five or ten minutes or until dissemination of the paste is complete. The mixture is then introduced into molds and cured at temperatures first at about 60° C. to 100° C., e. g. 75° C. for about 60 minutes or until a solid product is obtained. The product may be further hardened by baking it at about 125 to 150° C. The temperature and time of baking should not be so great as to cause discoloration or deterioration of the resins, otherwise there are no particular limitations except those imposed by economy of operation. It is to be understood that the inhibitor (trimethyl benzyl ammonium chloride and quinone) can be eliminated from the formula, but the mixture can then only be stored for a few hours without danger of premature gellation.

*Example II*

35 parts diethylene maleate phthalate
15 parts styrene
0.05 part trimethyl benzyl ammonium chloride
0.0005 part quinone These ingredients were admixed and were relatively stable. When it was desired to polymerize the mixture, it was admixed with one part of catalyst paste formulated as herein described by grinding together catalyst such as benzoyl peroxide in diethylene maleate or other of the herein described liquid polyesters to form a mixture of 50 per cent concentration. The composition to which the catalyst has been added can be introduced into the molds solidified at 75° C. and hardened at temperatures, for example, of 125 to 150° C. The product is hard and infusible.

*Example III*

32.5 parts 1,2 propylene maleate phthalate
18 parts styrene
0.053 part trimethyl benzyl ammonium chloride
0.00053 part quinone This mixture was stable but could be rendered readily polymerizable by the addition of ten per cent upon the basis of the total mixture of a paste comprising 1,2 propylene glycol maleate phthalate polyester and an equal amount by weight of benzoyl peroxide, tertiary butyl hydroperoxide, cyclohexyl hydroperoxide, acetyl peroxide, lauroyl peroxide or the like. The mixtures were hardened for a period of about 60 minutes at 75° C. and were baked subsequently at a temperature of about 125 to 150° C. in order to increase hardness and durability.

*Example IV*

32.5 parts ethylene—3,6 endomethylene, 4 tetrahydrophthalate
18 parts styrene
5 parts maleic anhydride
0.29 part dimethyl aniline hydrochloride
0.0116 part quinone This mixture was stable at temperatures of 70° F. for long periods of time. In order to polymerize it, it was admixed with 5 parts by weight of a paste of triethylene glycol polyester of maleic acid and benzoyl peroxide or other catalyst in equal amount. The mixture was readily polymerized by heating to 75° C. for one hour and then baking at temperatures within a range of about 125 to 150° C.

*Example V*

35 parts diethylene fumarate
18 parts styrene
0.053 part trimethyl benzyl ammonium chloride
0.00053 part hydroquinone This mixture was stable at ordinary temperatures but polymerized readily when it was admixed with one part of a paste consisting of equal parts of any of the catalysts herein enumerated and a polyester such as diethylene maleate.

*Example VI*

40 parts propylene adipate maleate
25 parts styrene
0.053 part trimethyl benzyl ammonium bromide
0.00053 part hydroquinone This mixture could be catalyzed so that it would cure at temperatures of 75 to 150° C. by addition of one part of a paste of equal parts by weight of diethylene maleate and benzoyl peroxide or its equivalent.

*Example VII*

35 parts diethylene maleate azelate
25 parts styrene
0.053 part triethylbenzyl ammonium sulphate
0.00053 part quinone This mixture was catalyzed by the addition of one part of a catalyst paste comprising equal weights of diethylene glycol maleate and benzoyl peroxide.

*Example VIII*

35 parts diethylene glycol maleic or fumaric acid polyester
25 parts styrene
0.053 part triethylbenzyl ammonium sulphate
0.00053 part quinone
1 part paste of diethylene glycol maleate and 50 per cent lauroyl peroxide The forms of the invention herein shown and described are to be regarded merely as examples of the application of the principles of the invention. It will be apparent to those skilled in the art that numerous modifications may be made therein without departure from the spirit of the invention or the scope of the appended claims.

We claim:

1. As a new composition of matter, a polyester of a dihydric alcohol and an alpha beta ethylenically unsaturated alpha beta dicarboxylic acid capable of copolymerization by addition with styrene to form hard resinous copolymers, said polyester containing in intimate dispersion a powdered peroxide catalyst of copolymerization in an amount of 40 to 60%, the mixture having a consistency approximating that of toothpaste.

2. As a new composition of matter, a polyester of diethylene glycol and maleic acid in intimate admixture with powdered peroxide catalyst capable of promoting copolymerization of said ester and styrene, said mixture being of a consistency approximating that of toothpaste and containing a peroxide catalyst in an amount of 40 to 50% based upon the total composition and being non-setting in storage.

3. As a new composition of matter a polyester of a dihydric alcohol of the formula

HO—ROR—OH where R is an alkylene radical containing 2 to 3 carbon atoms and an alpha beta ethylenically unsaturated alpha beta dicarboxylic acid capable of copolymerization by addition with styrene to form hard resinous copolymers, said polyester containing in intimate dispersion a powdered peroxide catalyst of copolymerization in an amount of 40 to 60%, the mixture being of a consistency approximating that of toothpaste.

4. A composition as defined in claim 3 in which the dicarboxylic acid is maleic acid.

5. A composition as defined in claim 3 in which the dicarboxylic acid is fumaric acid.

6. As a new composition of matter, a polyester of maleic acid and a dihydric alcohol of a class consisting of diethylene glycol and propylene glycol, said polyester containing in intimate dispersion a powdered peroxide catalyst of copolymerization in an amount of 30 to 70%, the mixture having a consistency approximating that of toothpaste.

HOWARD L. GERHART.
WILLIAM H. LYCAN.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,220,621 | Ellis | Nov. 5, 1940 |
| 2,255,313 | Ellis | Sept. 9, 1941 |
| 2,319,576 | Agens | May 18, 1943 |

OTHER REFERENCES

Rust, pp. 64 and 65, Jan. 1940, Ind. & Eng. Chem.

Vincent, pp. 1267–1269, Nov. 1937, Ind. & Eng. Chem.

Vanderbilt Rubber Handbook, 8th ed., 1942, p. 27, pub. by Vanderbilt Co., N. Y.

Mattiello, "Protective and Decorative Coatings," vol. III, p. 727, pub. 1943 by John Wiley, N. Y.